US012743373B2

(12) United States Patent
Tiwari et al.

(10) Patent No.: US 12,743,373 B2
(45) Date of Patent: Sep. 22, 2026

(54) GARBAGE COLLECTION WITH REDUCED BUFFER USAGE

(71) Applicant: Micron Technology, Inc., Boise, ID (US)

(72) Inventors: Ritesh Tiwari, Bangalore (IN); Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/283,762

(22) Filed: Jul. 29, 2025

(65) Prior Publication Data

US 2026/0030159 A1 Jan. 29, 2026

Related U.S. Application Data

(60) Provisional application No. 63/676,759, filed on Jul. 29, 2024.

(51) Int. Cl.
*G06F 12/02* (2006.01)

(52) U.S. Cl.
CPC ................................ *G06F 12/0253* (2013.01)

(58) Field of Classification Search
CPC ............. G06F 12/0253; G06F 12/0246; G06F 2212/1016; G06F 2212/1044; G06F 2212/7203; G06F 2212/7205
See application file for complete search history.

(56) References Cited

U.S. PATENT DOCUMENTS 8,904,090 B2 * 12/2014 Baek .................. G06F 12/0246 711/135
9,529,668 B2 * 12/2016 Wakchaure ......... G06F 11/1072
12,536,098 B1 * 1/2026 Horspool ............ G06F 12/0246
2009/0006719 A1 * 1/2009 Traister ............... G06F 12/0804 711/E12.008
2012/0151124 A1 6/2012 Baek et al.
2014/0258596 A1 9/2014 Kojima
2020/0285416 A1 9/2020 Wu et al.
2022/0188234 A1 6/2022 Na
2022/0300199 A1 * 9/2022 Buxton ............... G06F 12/0246
2024/0062821 A1 2/2024 Deng et al.

OTHER PUBLICATIONS

R. Subramani, H. Swapnil, N. Thakur, B. Radhakrishnan and K. Puttaiah, "Garbage Collection Algorithms for NAND Flash Memory Devices—An Overview," 2013 European Modelling Symposium, Manchester, UK, 2013, pp. 81-86. (Year: 2013).*
J. Jeong and Y. H. Song, "A technique to improve garbage collection performance for NAND flash-based storage systems," in IEEE Transactions on Consumer Electronics, vol. 58, No. 2, pp. 470-478, May 2012. (Year: 2012).*
"International Application Serial No. PCT US2025 039630, International Search Report mailed Nov. 24, 2025", 3 pages.
"International Application Serial No. PCT US2025 039630, Written Opinion mailed Nov. 24, 2025", 3 pages.

* cited by examiner

*Primary Examiner* — Kris E Mackes
(74) *Attorney, Agent, or Firm* — Schwegman Lundberg & Woessner, P.A.

(57) ABSTRACT

Various embodiments described herein provide for performing garbage collection with reduced buffer usage on a memory system. In particular, various embodiments use program suspend and program resume during garbage collection to facilitate performance of the garbage collection using a buffer that is smaller in size than buffers used during conventional garbage collection processes.

20 Claims, 5 Drawing Sheets

GARBAGE COLLECTION WITH REDUCED BUFFER USAGE

PRIORITY APPLICATION

This application claims the benefit of priority to U.S. Provisional Application Ser. No. 63/676,759, filed Jul. 29, 2024, which is incorporated herein by reference in its entirety.

TECHNICAL FIELD

Embodiments of the disclosure relate generally to memory systems and, more specifically, to performing garbage collection with reduced buffer usage on a memory system, such as a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
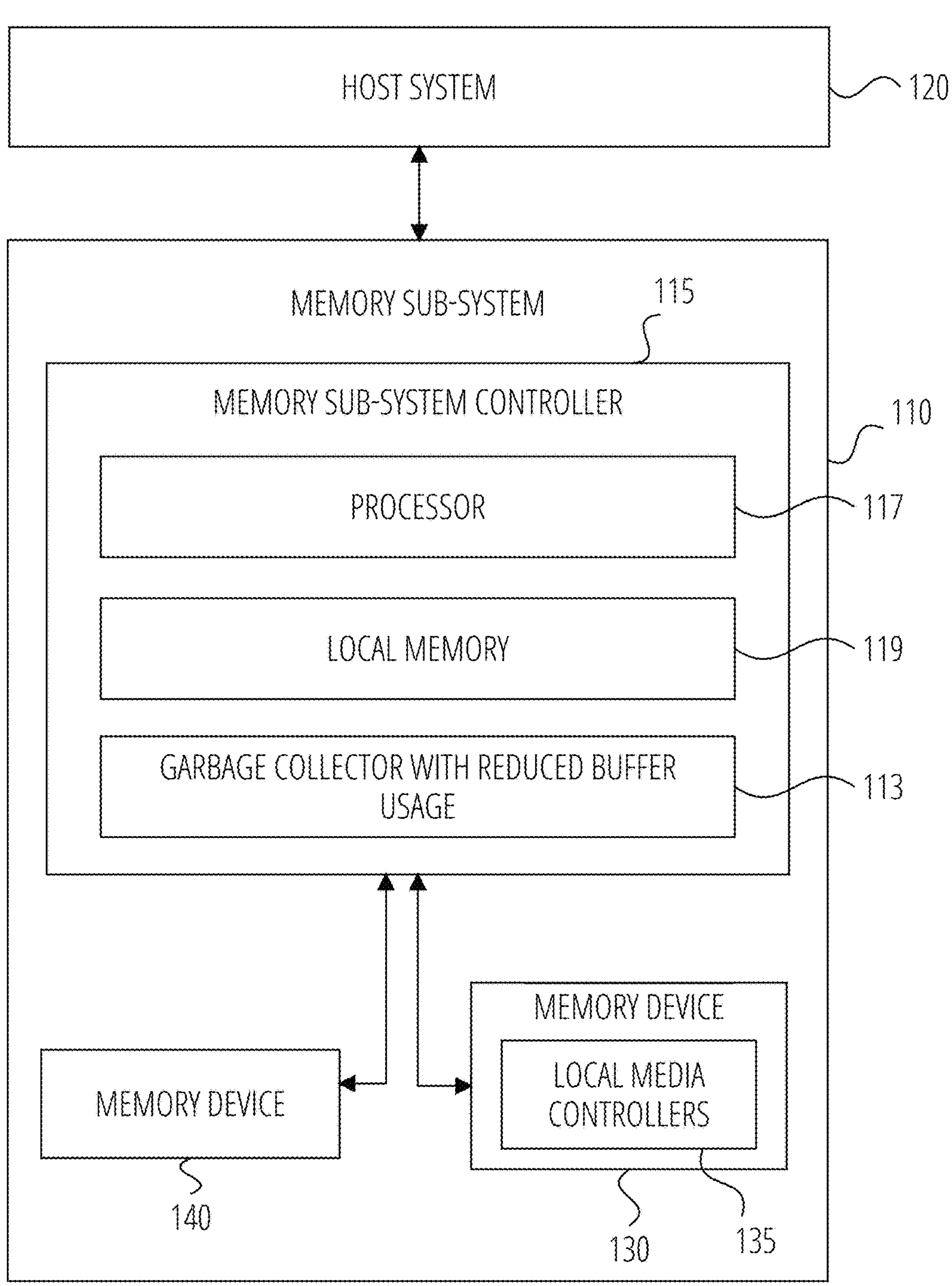
FIG. 1 is a block diagram illustrating an example computing system that includes a memory sub-system, in accordance with some embodiments of the present disclosure.

Aspects of the present disclosure are directed to performing garbage collection (e.g., a garbage collection process) with reduced buffer usage on a memory system, such as a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of a garbage collection management operation (or garbage collection process). The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Certain memory devices, such as NAND-type memory devices, comprise one or more blocks, (e.g., multiple blocks), with each of those blocks comprising multiple memory cells. For instance, a memory device can comprise multiple pages (also referred to as wordlines), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

Garbage collection (GC) operations are common to memory management of NAND-type memory devices and are important for maintaining the performance of the memory sub-systems that include one or more NAND-type memory devices. A GC operation usually involves the reclamation of blocks on one or more NAND-type memory devices that are no longer in use (e.g., storing invalid data) so that data can be written in those reclaimed blocks. Generally, a GC operation can comprise reading valid data from a block and rewriting it to a new block, and then erasing (now invalid) data stored in the old block so that the old block can be available for reuse in its entirety. The operation of reading valid data from a block and rewriting it to a new block can be referred to as folding the block, and the valid data read for the folding option can be referred to as data to be folded. The efficiency of GC operation can directly impact write amplification on a NAND-type memory device and, as such, the lifespan and performance of the NAND-type memory device. During a GC operation, a memory sub-system can use one or more memory buffers (or buffers) to temporarily hold data during read and write operations, and the management of the one or more buffers can be crucial to the speed of read and write operations, which in turn can impact GC operations. Efficient buffer management can reduce the time data spends in the buffer, thereby speeding up the overall GC operations and reducing wear on memory cells of NAND-type memory devices.

In the context of a memory system (e.g., memory sub-system), the memory system's controller can comprise local memory, such as a Static Random-Access Memory (SRAM), to facilitate operations on the memory system. For example, the memory system's controller can use at least a portion of the local memory as one or more buffers for GC operations. Unfortunately, other operations, such as write operations, can share the one or more buffers with the GC operations, thereby rendering the local memory a critical and limited resource. Typically, the dimensioning (e.g., sizing) of the one or more buffers is based on the needs of one or more GC operations to be performed. This is due to the fact during a GC operation on a block, the entire multi-page line is collected before initiating the GC programming (e.g., write) operation in order to avoid penalties associated with suspending operations.

Additionally, there are scenarios where it can be advantageous to retain host data in the local memory (e.g., SRAM) while concurrently performing a GC operation in the background. For instance, if the host system is sluggish, entering a halt state after writing only a few blocks (e.g., Logical Block Addressing (LBA) blocks, the memory system may end up performing proactive garbage collection (PGC) during brief idle periods between host writes. During these idle periods, there may further be situations where there is insufficient space in local memory to perform PGC, and the controller ends up inefficiently using power and reducing the endurance of the NAND-type memory devices. For example, the controller may end up flushing dummy data to permit the execution of PGC, or writing data to a small fragment cursor, which (while mitigating some impacts) leads to additional power usage and accelerated wear on media of the NAND-type memory devices.

Various embodiments described herein provide for performing garbage collection (e.g., a garbage collection process) with reduced buffer usage on a memory system. In particular, various embodiments use program suspend and program resume during garbage collection to facilitate performance of the garbage collection using a buffer (e.g., allocated on memory sub-system controller's local memory) that is smaller in size than buffers used during conventional garbage collection processes. With smaller buffers, various embodiments allocate less of the local memory of the memory sub-system's controller for use as a garbage collection buffer. According to various embodiments, a program suspend causes data currently stored in a set of page buffers (e.g., set of latches or static data cache (SDC)) of a memory device to be temporarily moved (e.g., temporarily parked) in one or more registers of the memory device. By temporarily moved data of the set of page buffers via a program suspend, various embodiments can free up the set of page buffers for reading (e.g., collecting) valid data from one or more blocks to be folded (e.g., marked for folding, such as in metadata of the block), which in turn can enable those embodiments to reduce the size of the buffer on the local memory of the memory sub-system controller. For instance, some embodiments enable a memory sub-system to use a buffer sized to a single page (e.g., 16 kb page). By use of various embodiments, a memory sub-system can implement improved buffer management during garbage collection, which in turn can improve performance and durability of the memory sub-system.

As used herein, a superblock of a memory device (e.g., of a memory system) comprises a plurality (e.g., collection or grouping) of blocks of the memory device. For example, a superblock of a NAND-type memory device can comprise a plurality of blocks that share a same position in each plane in each of one or more NAND-type memory die of the NAND-type memory device.

As used herein, a superpage of a memory device comprises a plurality (e.g., collection or grouping) of pages of the memory device. For example, a superpage of a NAND-type memory device can comprise a plurality of pages that share a same position in each block in each plane in each of one or more NAND-type memory die of the NAND-type memory device. A superpage can further be divided into different page types for different types of blocks. For instance, with respect to TLC blocks, a first superpage can comprise a plurality of upper pages (UPs) that share a same position in each TLC block in each plane in each of one or more NAND-type memory die of the NAND-type memory device, a second superpage can comprise a plurality of lower pages (LPs) that share a same position in each TLC block in each plane in each of one or more NAND-type memory die of the NAND-type memory device, and a third superpage can comprise a plurality of extra pages (XPs) that share a same position in each TLC block in each plane in each of one or more NAND-type memory die of the NAND-type memory device. According to various embodiments, data can be programmed on (e.g., written to) all pages of an individual superpage in parallel as a single (e.g., atomic) operation.

Disclosed herein are some examples of performing garbage collection with reduced buffer usage on a memory system (e.g., memory sub-system), as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD).

Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, single-level cells (SLCs), can store one bit per cell. Other types of memory cells, such as multiple-layer cells (MLCs), triple-layer cells (TLCs), quad-level cells (QLCs), and penta-level cells (PLCs), can store multiple bits per cell. In some embodiments, each of the memory devices 130, 140 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and ECC operations, encryption operations, caching operations, and address translations between a logical address (e.g., LB A, namespace) and a physical memory address (e.g., physical block address) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some embodiments, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a garbage collector with reduced buffer usage 113 (hereafter, the garbage collector 113) that enables or facilitates the memory sub-system controller 115 to perform garbage collection with reduced buffer usage on the memory sub-system 110 in accordance with various embodiments described herein. Alternatively, some or all of the garbage collector 113 is included by the local media controller 135, thereby enabling the local media controller 135 to enable or facilitate garbage collection with reduced buffer usage on the memory sub-system 110.

Figure 2A:
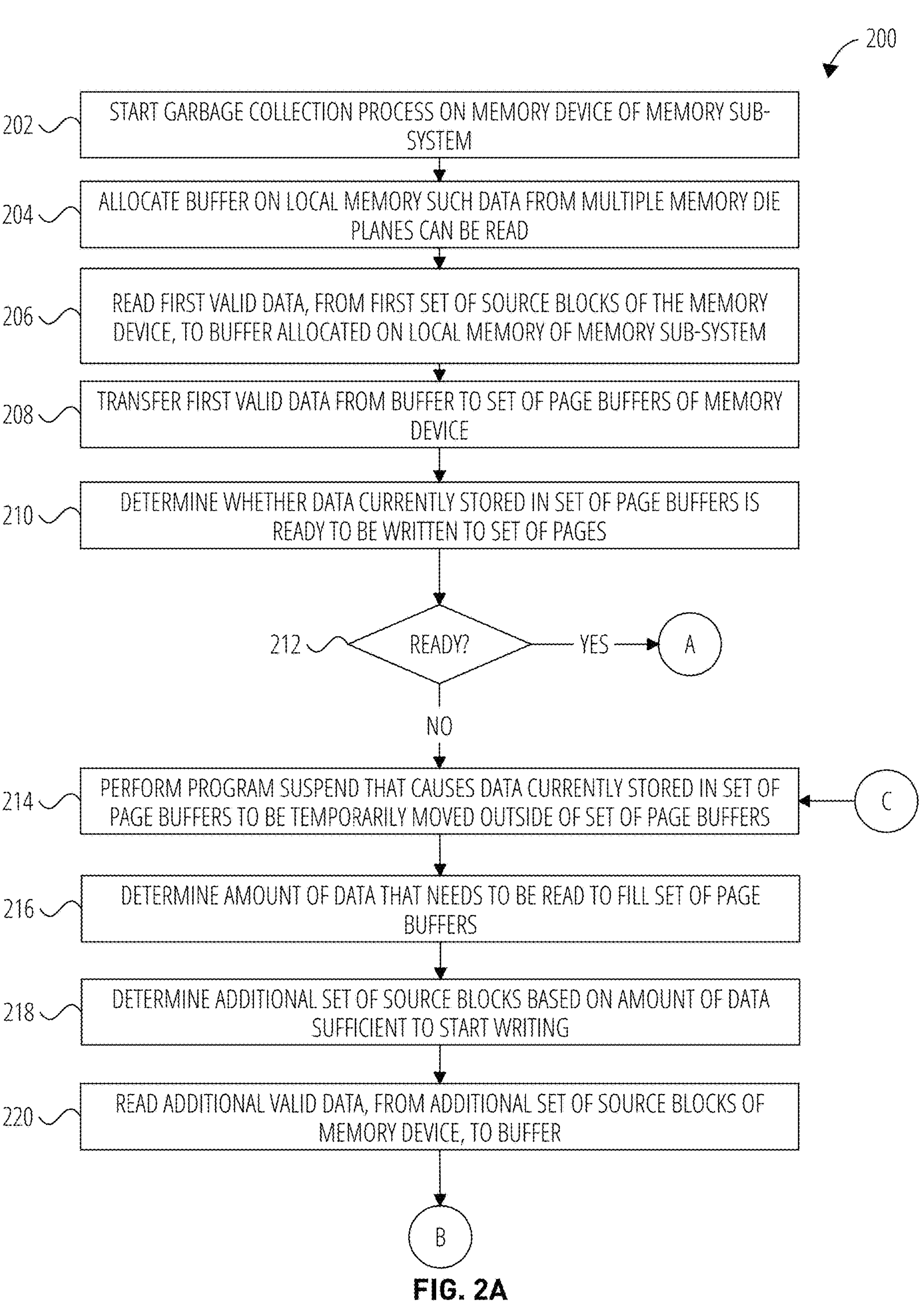
FIG. 2A, FIG. 2B, and FIG. 3 are flow diagrams illustrating example methods for performing garbage collection with reduced buffer usage on a memory sub-system, in accordance with some embodiments of the present disclosure.
Figure 2B:
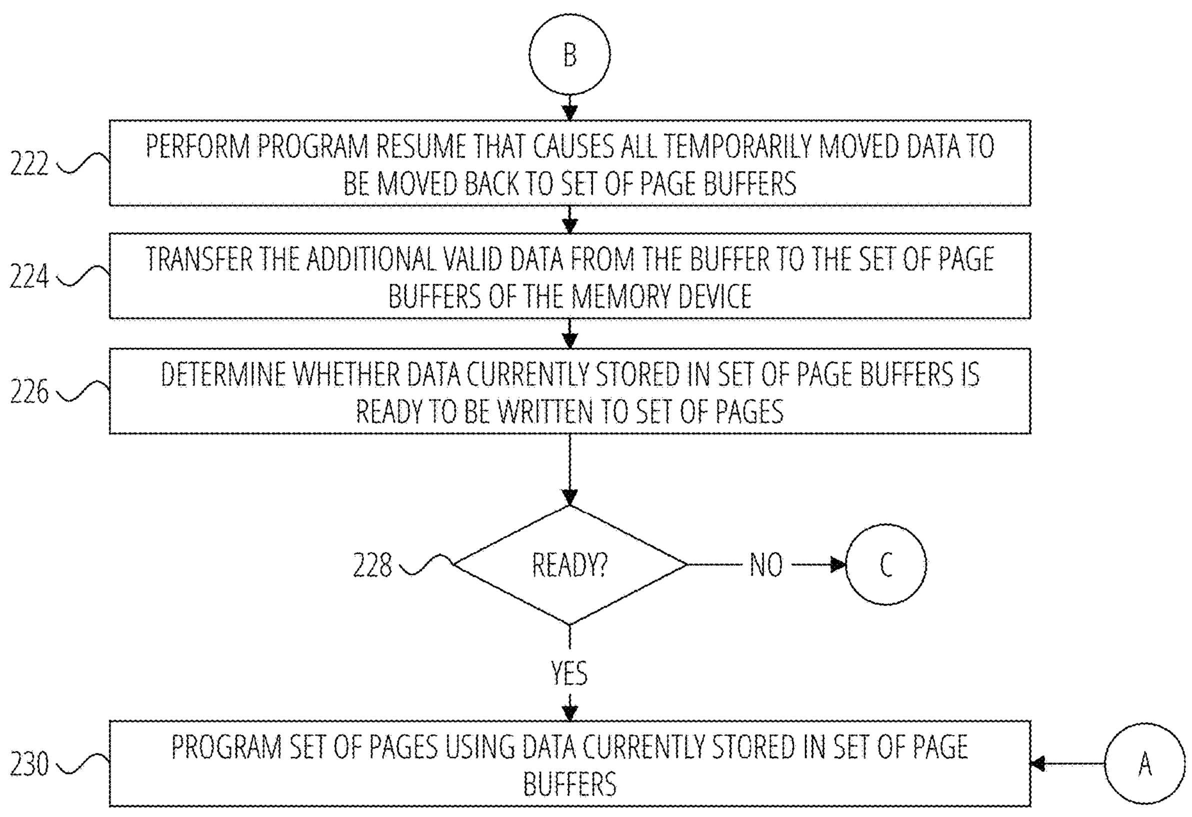
Figure 3:
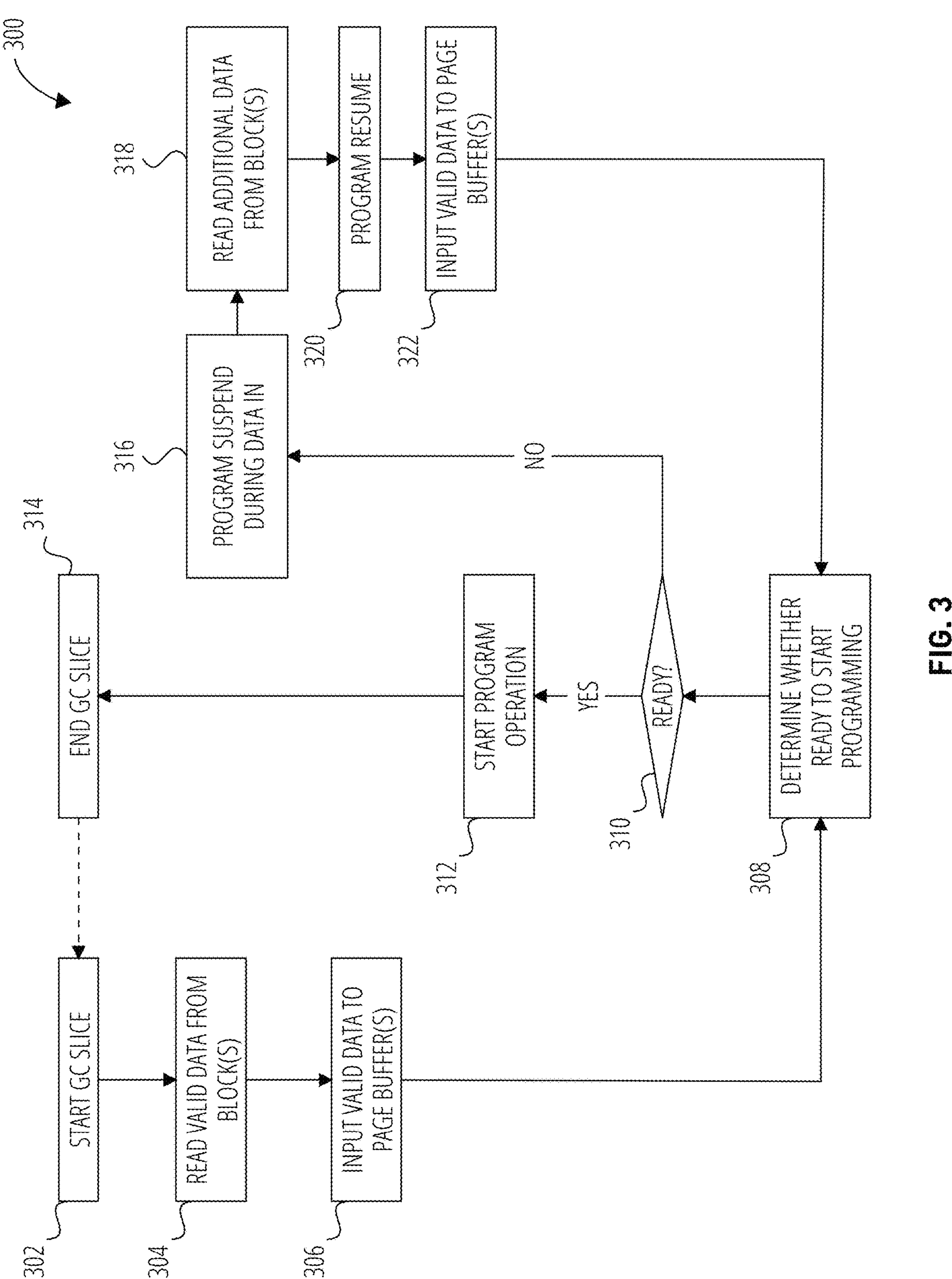

FIG. 2A, FIG. 2B, and FIG. 3 are flow diagrams illustrating example methods 200, 300 for performing garbage collection with reduced buffer usage on a memory sub-system, in accordance with some embodiments of the present disclosure. Any of methods 200, 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, any of methods 200, 300 is performed by the memory sub-system controller 115 of FIG. 1 based on the garbage collector 113. Additionally, or alternatively, for some embodiments, any of methods 200, 300 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 200 of FIG. 2A, at operation 202 a processing device (e.g., the processor 117 of the memory sub-system controller 115) starts a garbage collection process on a memory device (e.g., memory device 130) of a memory sub-system (e.g., 110). The garbage collection process can comprise identifying blocks that contain invalid or obsolete data (e.g., blocks storing a high percentage of invalid or obsolete data). The garbage collection consolidates valid data from the identified blocks by copying the valid data from the identified blocks to other available blocks. Once the valid data is copied (e.g., relocated), the identified blocks are marked for erasure or erased, thereby rendering them available for new data writes. Depending on the embodiment, the garbage collection can be triggered based on various factors including, without limitation: free space on the memory sub-system (e.g., if the amount of free space falls below a certain threshold, garbage collection is triggered to free up space by consolidating valid data and erasing blocks that contain invalid data); high data fragmentation leads to inefficient use of blocks on the memory sub-system (e.g., trigger garbage collection to reorganize data, consolidate valid data into fewer blocks, and free up fragmented blocks for future use); wear leveling (e.g., NAND-type memory die has a limited number of program/erase cycles per block, and garbage collection moves data from blocks with fewer erase cycles to blocks with more cycles to balance the wear); writing amplification mitigation (e.g., where the actual amount of data written to the memory is greater than the amount of data intended to be written, garbage collection can be triggered to mitigate this write amplification by optimizing how data is stored and reclaimed); and the like.

During performance of the garbage collection process, the processing device (e.g., the processor 117 of the memory sub-system controller 115) performs one or more of operations 204 through 230. In operation 204, the processing device allocates a buffer (e.g., allocates reserved memory space to operate as the buffer) on a local memory (e.g., 119) of the memory sub-system (e.g., 110). For some embodiments, the buffer is allocated such that the buffer enables reading data from multiple memory die planes of the memory device (e.g., 130). For example, the buffer can be allocated such that data can be read from all pages of multiple planes one NAND-type memory die of one type of page (e.g., LP, UP, or XP of a TLC blocks being folded). This can enable some embodiments to collect data to fill all of LP pages of one NAND-type memory die, input the collected data, send a program confirmation, wait for data to get moved from the static data cache SDC to internal latches of the memory device, and then repeat for all pages of the next page type, such as UP pages or XP pages.

At operation 206, the processing device (e.g., the processor 117 of the memory sub-system controller 115) reads first valid data, from a first set of source blocks of the memory device (e.g., first set of source blocks marked for folding by the memory sub-system), to the buffer allocated on the local memory. The reading of the first valid data can represent the beginning of a new slice of the garbage collection process, where the new slice ends after all the data read during the new slice is programmed (e.g., written) to one or more destination blocks available on the memory device. For some embodiments, the garbage collection process processes multiple slices prior to the garbage collection process ending. For various embodiments, the first valid data comprises multiple pages of data (e.g., 16 kb pages), with each page comprising multiple data words (e.g., 4 data words). The number of pages read during operation 206 can be a predetermined number (e.g., N number of pages), which can be configurable by a host system (e.g., 120). For various embodiments, each block of the first set of source blocks is a block marked for folding. Additionally, for various embodiments, each block of the first set of source blocks is at least partially storing valid data. An individual block of the first set of source blocks can comprise a superblock of the memory device (e.g., 130), or the first set of source blocks can form a superblock of the memory device.

During operation 208, the processing device (e.g., the processor 117 of the memory sub-system controller 115) transfers the first valid data from the buffer to a set of page buffers of the memory device. For some embodiments, the set of page buffers comprises a cache register (SDC) of the memory devices or a set of latches of the memory devices. By operation 208, the first valid data is inputted to the memory device for eventual programming.

The processing device (e.g., the processor 117 of the memory sub-system controller 115), at operation 210, determines whether data currently stored in the set of page buffers is ready to be written to a set of pages by a program operation (e.g., data using currently stored in the set of page buffers). For various embodiments, the set of pages is part of a set of destination blocks available on the memory device (e.g., available for new data writes). For various embodiments, operation 210 comprises determining whether the data currently stored in the set of page buffers is enough data to start writing the data currently stored in the set of page buffers to the set of pages. The processing device can determine there is enough data to start writing if the set of page buffers is sufficiently filled with data (e.g., storing a data word worth of data). Depending on the embodiment, the set of page buffers can be considered sufficiently filled based on a threshold value (e.g., percentage value), which can indicate how much of the set of page buffers needs to be storing data before programming can start. For some embodiments, the set of page buffers is considered sufficiently filled when an entire data word's worth of data is currently stored in the set of page buffers. Where the set of pages being programmed comprises a superpage, which comprises a plurality of pages (e.g., of a single page type, such as LP, UP, or XP) across multiple planes (e.g., 4 planes) of one or more memory die (e.g., NAND-type memory die) of the memory device, the size of the set of page buffers can be at least the size of a single superpage and can be considered sufficiently filled (to start writing) when there is a single superpage's worth of data filled in the set of page buffers. By filling the set of page buffers with a sufficient amount of data prior to the start of programming, various embodiments can enable the data to be programmed (e.g., written) as a single atomic operation on the memory device (e.g., data programmed to multiple pages on multiple planes across multiple memory die in parallel), which can result in operational efficiency on the memory device during the garbage collection process.

At decision block 212, the method 200 proceeds to operation 230 in response to the processing device determining that the data currently stored in the set of page buffers is ready to be written to the set of pages by the program operation, and the method 200 proceeds to operation 214 in response to the processing device determining that the data currently stored in the set of page buffers is not ready to be written to the set of pages by the program operation.

During operation 214, the processing device (e.g., the processor 117 of the memory sub-system controller 115) performs a program suspend that causes the data currently stored in the set of page buffers to be temporarily moved outside of the set of page buffers. For example, the program suspend causes the data currently stored in the set of page buffers to be temporarily moved to one or more registers (e.g., internal registers of the memory device or hardware registers operatively coupled to the processing device) for temporary storage. In doing so, various embodiments can free up the set of page buffers of the memory device to be used during a subsequent read operation to collect additional valid data to fill up the set of page buffers (e.g., for the current slice of the garbage collection process), where the additionally valid data will be relocated (e.g., written) to available blocks during a next program operation.

After operation 214, the method 300 proceeds to operation 216, where the processing device (e.g., the processor 117 of the memory sub-system controller 115) determines an amount of data that needs to be read (e.g., from an additional set of source blocks) to fill the set of page buffers (e.g., to fill remaining space in the allocated buffer). Additionally, at operation 218, the processing device determines (e.g., identifies) an additional set of source blocks (e.g., additional set of source blocks marked for folding by the memory sub-system) to read from based on the amount of data needed to sufficiently fill the set of page buffers to start writing the data currently stored in the set of page buffers to the set of pages. Overall, the aim of operations 216 and 218 is to read enough data, and to read from source blocks that are storing enough valid data, to fill the set of page buffers sufficiently to start writing data to one or more destination blocks. For instance, if the processing device determines that the set of page buffers has Y kilobytes of space remaining to be filled before programming can start, and the page size is 16 kb, the processing device would determine that Y/16 number of pages of valid data need to be read from source blocks (e.g., marked for folding) that have at least Y/16 number of pages of valid data available for garbage collection.

After operation 218, during operation 220, the processing device (e.g., the processor 117 of the memory sub-system controller 115) reads additional valid data, from an additional set of source blocks of the memory device (e.g., additional set of source blocks marked for folding that is determined by operation 218), to the buffer. For various embodiments, the amount of additional valid data that is read during operation 220 is determined based on the amount of data that needs to be read to fill the set of page buffers. Operation 220 can comprise the processing device determining whether the reading of the additional valid data comprises (e.g., involves) reading from one or more memory die planes of the memory device for which a static data cache of the memory device is not loaded with data to be programmed and, if so, causing movement of the loaded data between the set of page buffers (e.g., SDC) of the memory device and a set of internal data latches of the memory device to be skipped prior to the additional valid data being read from the additional set of source blocks. As a result, if a reading during operation 220 is being performed on memory die planes that have not been loaded already with data to be programmed, various embodiments can skip extra operational overhead due to data being moved back and forward between the set of page buffers (e.g., SDC) and internal registers (e.g., data latches).

Referring now to FIG. 2B, operation 220 is followed by operation 222, where the processing device (e.g., the processor 117 of the memory sub-system controller 115) performs a program resume that causes temporarily moved data (e.g., all temporarily moved data) to be moved back to the set of page buffers. For some embodiments, the temporarily moved data is moved from a set of registers (e.g., internal registers of the memory device or hardware registers operatively coupled to the processing device) to the set of page buffers.

After operation 222, at operation 224, the processing device (e.g., the processor 117 of the memory sub-system controller 115) transfers the additional valid data from the buffer to the set of page buffers of the memory device. By operation 224, the additional valid data is inputted to the memory device for eventual programming. Thereafter, at operation 226, the processing device determines whether the data currently stored in the set of page buffers is ready to be written to the set of pages by the program operation (e.g., using data currently stored in the set of page buffers). The determination (of whether the data currently stored in the set of page buffers is ready to be programmed) can be similar to the determination performed at operation 210.

At decision block 228, in response to the processing device determining that the data currently stored in the set of page buffers is not ready to be written to the set of pages, the method 200 returns to operation 214 and the operations that follow. Alternatively, at decision block 228, in response to the processing device determining that the data currently stored in the set of page buffers is ready to be ready to be written to the set of pages by the program operation, the method 200 proceeds to operation 230.

At operation 230, the processing device (e.g., the processor 117 of the memory sub-system controller 115) programs the set of pages using the data currently stored in the set of page buffers (e.g., writes to the data currently stored in the set of page buffers to the set of pages). As noted herein, when the set of pages is programmed with data currently stored in the set of page buffers, the current slice of the garbage collection process ends, thereby enabling another slice. For various embodiments, operations 214 through 226 represent a single iteration of operations that can be performed one or more times with respect to a current slice of the garbage collection process currently being performed. When the method 200 returns to operation 214 from the decision block 228, the processing device is performing the iteration of operations again.

Referring now to FIG. 3, the method 300 illustrates an example implementation of the method 200 of FIG. 2A and FIG. 2B. In particular, the method 300 illustrates where slices of a garbage process start and end in accordance with some embodiments. As described herein, a garbage collection process of some embodiments processes multiple processes multiple slices prior to the garbage collection process ending, where a new slice starts with reading of first valid data and can comprise reading additional valid data one or more times prior to all data read during the slice being programmed to one or more destination blocks available on a memory device (e.g., 130).

While a garbage collection process is operating on a memory device, at method start 302, the method 300 starts with a new slice (hereafter, current garbage collection (GC) slice) of the garbage collection process. As part of starting the current GC slice, at operation 304, a processing device (e.g., the processor 117 of the memory sub-system controller 115) reads (first) valid data, from a set of source blocks on the memory device (e.g., set of source blocks marked for folding), to a buffer allocated on a local memory (e.g., 119) operatively coupled to the processing device (e.g., memory sub-system controller's local memory). At operation 306, the processing device inputs the (first) valid data to a set of page buffers of the memory device. For example, the processing device can input the (first) valid data to a static data cache (SDC) of the memory device. During the input (e.g., data in) process, the (first) valid data stored in the buffer is transferred (e.g., copied) from the buffer to the set of page buffers. Thereafter, at operation 308, the processing device determines (for the current GC slice) whether the garbage collection process is ready to start the programming of data currently stored in the set of page buffers to a set of destination blocks available on the memory device. For some embodiments, the determination of operation 308 comprises determining whether the set of page buffers is sufficiently filled to start the programming. As described herein, the set of page buffers can be considered sufficiently filled once it is storing a data word worth of data, or a superpage worth of data.

At decision block 310, in response to the processing device (e.g., the processor 117 of the memory sub-system controller 115) determining that the garbage collection process is ready to start programming data currently stored in the set of page buffers to the set of destination blocks, the method 300 proceeds to operation 312, where the processing device starts the program operation. After the program operation successfully concludes, the method 300 moves to the method end 314, where the current GC slice is considered to have ended and either a new GC slice is started for the garbage collection process or the garbage collection process ends for now. Alternatively, at decision block 310, in response to the processing device determining that the garbage collection process is not ready to start programming data currently stored in the set of page buffers to the set of destination blocks, the method 300 proceeds to operation 316.

At operation 316, the processing device (e.g., the processor 117 of the memory sub-system controller 115) performs a program suspend that causes data inputted to the set of page buffers to be temporarily moved (e.g., temporarily parked) outside of the set of page buffers (e.g., temporarily moved to one or more internal registers of the memory device). As described herein, temporarily moving the data from the set of page buffers can free up the set of page buffers to be used for reading (e.g., collection) of additional valid data for the current GC slice of the garbage collection process. After operation 316, at operation 318, the processing device reads additional valid data, from another set of source blocks on the memory device (e.g., another set of source blocks marked for folding by the memory sub-system), to the buffer allocated on the local memory (e.g., 119) operatively coupled to the processing device. Then, at operation 320, the processing device performs a program resume that causes the temporarily moved data (e.g., temporarily parked data) to be moved back to the set of page buffers and, at operation 322, the processing device inputs the additional valid data to the set of page buffers (e.g., SDC) of the memory device. As noted, the additional valid data stored in the buffer is transferred (e.g., copied) from the buffer to the set of page buffers. At this point, both the temporarily moved data and the additional valid data are stored in the set of page buffers. Thereafter, the method 300 returns to operation 308, where the processing device (re) determines whether (for the current GC slice) whether the garbage collection process is ready to start programming data currently stored in the set of page buffers to a set of destination blocks available on the memory device.

Figure 4:
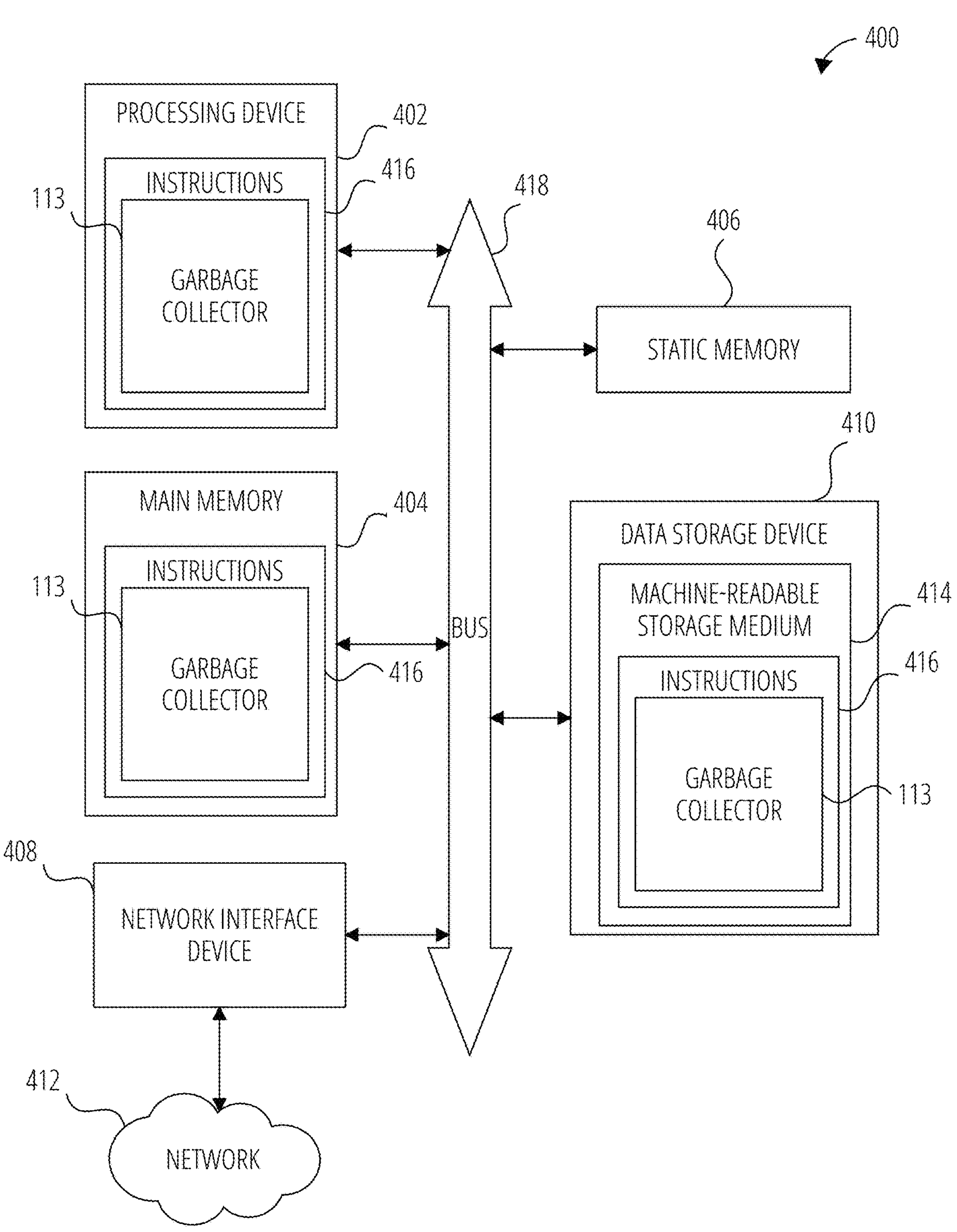
FIG. 4 is a block diagram of an example computer system in which embodiments of the present disclosure may operate.

FIG. 4 illustrates an example machine in the form of a computer system 400 within which a set of instructions can be executed for causing the machine to perform any one or more of the methodologies discussed herein. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., ROM, flash memory, DRAM such as SDRAM or Rambus DRAM (RDRAM), etc.), a static memory 406 (e.g., flash memory, static random access memory (SRAM), etc.), and a data storage device 410, which communicate with each other via a bus 418.

The processing device 402 represents one or more general-purpose processing devices such as a microprocessor, a central processing unit, or the like. More particularly, the processing device 402 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 402 can also be one or more special-purpose processing devices such as an application-specific integrated circuit (ASIC), a field programmable gate array (FPGA), a digital signal processor (DSP), a network processor, or the like. The processing device 402 is configured to execute instructions 416 for performing the operations and steps discussed herein. The computer system 400 can further include a network interface device 408 to communicate over a network 412.

The data storage device 410 can include a machine-readable storage medium 414 (also known as a computer-readable medium) on which is stored one or more sets of instructions 416 or software embodying any one or more of the methodologies or functions described herein. The instructions 416 can also reside, completely or at least partially, within the main memory 404 and/or within the processing device 402 during execution thereof by the computer system 400, the main memory 404 and the processing device 402 also constituting machine-readable storage media. The machine-readable storage medium 414, data storage device 410, and/or main memory 404 can correspond to the memory sub-system 110 of FIG. 1.

In one embodiment, the instructions 416 include instructions to implement functionality corresponding to performing garbage collection with reduced buffer usage on a memory sub-system as described herein (e.g., the garbage collector 113 of FIG. 1). While the machine-readable storage medium 414 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1 is a system comprising: a memory device; local memory; and a processing device, operatively coupled to the memory device and the local memory, configured to perform operations comprising: starting a garbage collection process on the memory device; and during the garbage collection process: determining whether data currently stored in a set of page buffers of the memory device is ready to be written to a set of pages by a program operation, the set of page buffers storing first valid data from a first set of source blocks of the memory device, the set of pages being part of a set of destination blocks available on the memory device; and in response to determining that the data currently stored in the set of page buffers is not ready to be written to the set of pages by the program operation, performing an iteration of operations comprising: performing a program suspend that causes the data currently stored in the set of page buffers to be temporarily moved outside of the set of page buffers; reading additional valid data from an additional set of source blocks of the memory device such that the additional valid data is stored to a buffer allocated on the local memory; performing a program resume that causes temporarily moved data to be moved back to the set of page buffers; and transferring the additional valid data from the buffer to the set of page buffers of the memory device.

In Example 2, the subject matter of Example 1 includes, wherein the operations comprise: during the garbage collection process: reading the first valid data from the first set of source blocks of the memory device such that the first valid data is stored to the buffer; and transferring the first valid data from the buffer to the set of page buffers of the memory device.

In Example 3, the subject matter of Examples 1-2 includes, wherein the determining of whether the data currently stored in the set of page buffers is ready to be written to the set of pages by the program operation comprises: determining whether the data currently stored in the set of page buffers is enough data to start writing the data currently stored in the set of page buffers to the set of pages.

In Example 4, the subject matter of Examples 1-3 includes, wherein the iteration of operations comprises: after the transferring of the additional valid data from the buffer to the set of page buffers of the memory device: determining whether the data currently stored in the set of page buffers is ready to be written to the set of pages by the program operation; and performing the iteration of operations again in response to determining that the data currently stored in the set of page buffers is not ready to be written to the set of pages by the program operation.

In Example 5, the subject matter of Examples 1-4 includes, wherein the iteration of operations comprises: after the transferring of the additional valid data from the buffer to the set of page buffers of the memory device: determining whether the data currently stored in the set of page buffers is ready to be programmed to the set of pages using the data currently stored in the set of page buffers; and programming the set of pages using the data currently stored in the set of page buffers in response to determining that the data currently stored in the set of page buffers is ready to be written to the set of pages by the program operation.

In Example 6, the subject matter of Examples 3-5 includes, wherein the iteration of operations comprises: prior to the reading of the additional valid data, from the additional set of source blocks of the memory device, to the buffer, determining the additional set of source blocks based on an amount of data sufficient to start writing the data currently stored in the set of page buffers to the set of pages.

In Example 7, the subject matter of Examples 1-6 includes, wherein the iteration of operations comprises: prior to the reading of the additional valid data, from the additional set of source blocks of the memory device, to the buffer, determining an amount of data that needs to be read to fill the set of page buffers, an amount of the additional valid data that is read being determined based on the amount of data that needs to be read to fill the set of page buffers.

In Example 8, the subject matter of Examples 1-7 includes, wherein the first valid data comprises a first set of data words, and wherein the additional valid data comprises a second set of data words.

In Example 9, the subject matter of Examples 1-8 includes, wherein the set of pages form a superpage across multiple planes of one or more NAND-type memory die of the memory device.

In Example 10, the subject matter of Examples 1-9 includes, wherein the program suspend causes data to be temporarily moved to a set of internal registers of the memory device.

In Example 11, the subject matter of Examples 1-10 includes, wherein the program suspend causes data to be temporarily moved to a set of hardware registers operatively coupled to the processing device.

In Example 12, the subject matter of Examples 1-11 includes, wherein the reading of the additional valid data, from the additional set of source blocks, to the buffer: determining whether the reading of the additional valid data comprises reading from one or more memory die planes of the memory device for which a static data cache of the memory device is not loaded with data to be programmed; and in response to determining that the reading of the additional valid data does comprise reading from one or more memory die planes of the memory device for which the static data cache of the memory device is not loaded with loaded data to be programmed, causing movement of the loaded data between the set of page buffers of the memory device and a set of internal data latches of the memory device to be skipped prior to the additional valid data being read from the additional set of source blocks.

In Example 13, the subject matter of Examples 1-12 includes, wherein the operations comprise: prior to the reading of the first valid data to the buffer allocated on the local memory, allocating the buffer on the local memory such that the buffer enables reading data from multiple memory die planes of the memory device.

Example 20 is a method to implement any of Examples 1-13.

Example 21 is at least one machine-readable medium comprising instructions that, when executed by a processing device of a memory sub-system, cause the processing device to perform operations to implement any of Examples 1-14.

Example 22 is at least one machine-readable storage medium comprising instructions that, when executed by a processing device of a memory sub-system, cause the processing device to perform operations comprising: starting a garbage collection process on a memory device of the memory sub-system; and during the garbage collection process: determining whether data currently stored in a set of page buffers of the memory device is ready to be written to a set of pages by a program operation, the set of page buffers storing first valid data from a first set of source blocks of the memory device, the set of pages being part of a set of destination blocks available on the memory device; and in response to determining that the data currently stored in the set of page buffers is not ready to be written to the set of pages by the program operation, performing an iteration of operations comprising: performing a program suspend that causes the data currently stored in the set of page buffers to be temporarily moved outside of the set of page buffers; reading additional valid data from an additional set of source blocks of the memory device such that the additional valid data is stored to a buffer allocated on local memory of the memory sub-system; performing a program resume that causes temporarily moved data to be moved back to the set of page buffers; and transferring the additional valid data from the buffer to the set of page buffers of the memory device.

In Example 23, the subject matter of Example 22 includes, wherein the determining of whether the data currently stored in the set of page buffers is ready to be written to the set of pages by the program operation comprises: determining whether the data currently stored in the set of page buffers is enough data to start writing the data currently stored in the set of page buffers to the set of pages.

In Example 24, the subject matter of Examples 22-23 includes, wherein the iteration of operations comprises: after the transferring of the additional valid data from the buffer to the set of page buffers of the memory device: determining whether the data currently stored in the set of page buffers is ready to be written to the set of pages by the program operation; and performing the iteration of operations again in response to determining that the data currently stored in the set of page buffers is not ready to be written to the set of pages by the program operation.

In Example 25, the subject matter of Examples 22-24 includes, wherein the iteration of operations comprises: after the transferring of the additional valid data from the buffer to the set of page buffers of the memory device: determining whether the data currently stored in the set of page buffers is ready to be programmed to the set of pages using the data currently stored in the set of page buffers; and programming the set of pages using the data currently stored in the set of page buffers in response to determining that the data currently stored in the set of page buffers is ready to be written to the set of pages by the program operation.

In Example 26, the subject matter of Examples 22-25 includes, wherein the iteration of operations comprises: prior to the reading of the additional valid data, from the additional set of source blocks of the memory device to be folded, to the buffer, determining the additional set of source blocks based on an amount of data sufficient to start writing the data currently stored in the set of page buffers to the set of pages.

In Example 27, the subject matter of Examples 22-26 includes, wherein the iteration of operations comprises: prior to the reading of the additional valid data, from the additional set of source blocks of the memory device, to the buffer, determining an amount of data that needs to be read to fill the set of page buffers, an amount of the additional valid data that is read being determined based on the amount of data that needs to be read to fill the set of page buffers.

Example 28 is a method to implement any of Examples 22-27.

Example 29 is a system to implement any of Examples 22-27.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth. A machine-readable storage medium can be non-transitory (in other words, not having any transitory signals) in that it does not embody a propagating signal. However, labeling a machine-readable storage medium "non-transitory" should not be construed to mean that the machine-readable storage medium is incapable of movement; the machine-readable storage medium should be considered as being transportable from one physical location to another.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A system comprising:

a memory device;

local memory; and a processing device, operatively coupled to the memory device and the local memory, configured to perform operations comprising:

starting a garbage collection process on the memory device; and during the garbage collection process:

determining whether data currently stored in a set of page buffers of the memory device is ready to be written to a set of pages by a program operation, the set of page buffers storing first valid data from a first set of source blocks of the memory device, the set of pages being part of a set of destination blocks available on the memory device; and in response to determining that the data currently stored in the set of page buffers is not ready to be written to the set of pages by the program operation, performing an iteration of operations comprising:

performing a program suspend that causes the data currently stored in the set of page buffers to be temporarily moved outside of the set of page buffers;

reading additional valid data from an additional set of source blocks of the memory device such that the additional valid data is stored to a buffer allocated on the local memory;

performing a program resume that causes temporarily moved data to be moved back to the set of page buffers; and transferring the additional valid data from the buffer to the set of page buffers of the memory device.

2. The system of claim 1, wherein the operations comprise:

during the garbage collection process:

reading the first valid data from the first set of source blocks of the memory device such that the first valid data is stored to the buffer; and transferring the first valid data from the buffer to the set of page buffers of the memory device.

3. The system of claim 1, wherein the determining of whether the data currently stored in the set of page buffers is ready to be written to the set of pages by the program operation comprises:

determining whether the data currently stored in the set of page buffers is enough data to start writing the data currently stored in the set of page buffers to the set of pages.

4. The system of claim 1, wherein the iteration of operations comprises:

after the transferring of the additional valid data from the buffer to the set of page buffers of the memory device:

determining whether the data currently stored in the set of page buffers is ready to be written to the set of pages by the program operation; and performing the iteration of operations again in response to determining that the data currently stored in the set of page buffers is not ready to be written to the set of pages by the program operation.

5. The system of claim 1, wherein the iteration of operations comprises:

after the transferring of the additional valid data from the buffer to the set of page buffers of the memory device:

determining whether the data currently stored in the set of page buffers is ready to be programmed to the set of pages using the data currently stored in the set of page buffers; and programming the set of pages using the data currently stored in the set of page buffers in response to determining that the data currently stored in the set of page buffers is ready to be written to the set of pages by the program operation.

6. The system of claim 3, wherein the iteration of operations comprises:

prior to the reading of the additional valid data, from the additional set of source blocks of the memory device, to the buffer, determining the additional set of source blocks based on an amount of data sufficient to start writing the data currently stored in the set of page buffers to the set of pages.

7. The system of claim 1, wherein the iteration of operations comprises:

prior to the reading of the additional valid data, from the additional set of source blocks of the memory device, to the buffer, determining an amount of data that needs to be read to fill the set of page buffers, an amount of the additional valid data that is read being determined based on the amount of data that needs to be read to fill the set of page buffers.

8. The system of claim 1, wherein the first valid data comprises a first set of data words, and wherein the additional valid data comprises a second set of data words.

9. The system of claim 1, wherein the set of pages form a superpage across multiple planes of one or more NAND-type memory die of the memory device.

10. The system of claim 1, wherein the program suspend causes data to be temporarily moved to a set of internal registers of the memory device.

11. The system of claim 1, wherein the program suspend causes data to be temporarily moved to a set of hardware registers operatively coupled to the processing device.

12. The system of claim 1, wherein the reading of the additional valid data, from the additional set of source blocks, to the buffer:

determining whether the reading of the additional valid data comprises reading from one or more memory die planes of the memory device for which a static data cache of the memory device is not loaded with data to be programmed; and in response to determining that the reading of the additional valid data does comprise reading from one or more memory die planes of the memory device for which the static data cache of the memory device is not loaded with loaded data to be programmed, causing movement of the loaded data between the set of page buffers of the memory device and a set of internal data latches of the memory device to be skipped prior to the additional valid data being read from the additional set of source blocks.

13. The system of claim 1, wherein the operations comprise:

prior to the reading of the first valid data to the buffer allocated on the local memory, allocating the buffer on the local memory such that the buffer enables reading data from multiple memory die planes of the memory device.

14. At least one non-transitory machine-readable storage medium comprising instructions that, when executed by a processing device of a memory sub-system, cause the processing device to perform operations comprising:

starting a garbage collection process on a memory device of the memory sub-system; and during the garbage collection process:

determining whether data currently stored in a set of page buffers of the memory device is ready to be written to a set of pages by a program operation, the set of page buffers storing first valid data from a first set of source blocks of the memory device, the set of pages being part of a set of destination blocks available on the memory device; and in response to determining that the data currently stored in the set of page buffers is not ready to be written to the set of pages by the program operation, performing an iteration of operations comprising:

performing a program suspend that causes the data currently stored in the set of page buffers to be temporarily moved outside of the set of page buffers;

reading additional valid data from an additional set of source blocks of the memory device such that the additional valid data is stored to a buffer allocated on local memory of the memory sub-system;

performing a program resume that causes temporarily moved data to be moved back to the set of page buffers; and transferring the additional valid data from the buffer to the set of page buffers of the memory device.

15. The non-transitory machine-readable storage medium of claim 14, wherein the determining of whether the data currently stored in the set of page buffers is ready to be written to the set of pages by the program operation comprises:

determining whether the data currently stored in the set of page buffers is enough data to start writing the data currently stored in the set of page buffers to the set of pages.

16. The non-transitory machine-readable storage medium of claim 14, wherein the iteration of operations comprises:

after the transferring of the additional valid data from the buffer to the set of page buffers of the memory device:

determining whether the data currently stored in the set of page buffers is ready to be written to the set of pages by the program operation; and performing the iteration of operations again in response to determining that the data currently stored in the set of page buffers is not ready to be written to the set of pages by the program operation.

17. The non-transitory machine-readable storage medium of claim 14, wherein the iteration of operations comprises:

after the transferring of the additional valid data from the buffer to the set of page buffers of the memory device:

determining whether the data currently stored in the set of page buffers is ready to be programmed to the set of pages using the data currently stored in the set of page buffers; and programming the set of pages using the data currently stored in the set of page buffers in response to determining that the data currently stored in the set of page buffers is ready to be written to the set of pages by the program operation.

18. The non-transitory machine-readable storage medium of claim 15, wherein the iteration of operations comprises:

prior to the reading of the additional valid data, from the additional set of source blocks of the memory device to be folded, to the buffer, determining the additional set of source blocks based on an amount of data sufficient to start writing the data currently stored in the set of page buffers to the set of pages.

19. The non-transitory machine-readable storage medium of claim 14, wherein the iteration of operations comprises:

prior to the reading of the additional valid data, from the additional set of source blocks of the memory device, to the buffer, determining an amount of data that needs to be read to fill the set of page buffers, an amount of the additional valid data that is read being determined based on the amount of data that needs to be read to fill the set of page buffers.

20. A method comprising:

starting a garbage collection process on a memory device of a memory sub-system; and during the garbage collection process:

reading first valid data, from a first set of source blocks of the memory device, to a buffer allocated on local memory of the memory sub-system;

transferring the first valid data from the buffer to a set of page buffers of the memory device;

determining that data currently stored in the set of page buffers is not ready to be written to a set of pages using by a program operation, the set of pages being part of a set of destination blocks available on the memory device; and in response to determining that the data currently stored in the set of page buffers is not ready to be written to the set of pages by the program operation, performing an iteration of operations comprising:

performing a program suspend that causes the data currently stored in the set of page buffers to be temporarily moved outside of the set of page buffers;

reading additional valid data from an additional set of source blocks of the memory device such that the additional valid data is stored to the buffer;

performing a program resume that causes temporarily moved data to be moved back to the set of page buffers; and transferring the additional valid data from the buffer to the set of page buffers of the memory device.

* * * * *